United States Patent
Huthmann et al.

[11] Patent Number: 6,129,112
[45] Date of Patent: Oct. 10, 2000

[54] FLOW REGULATOR

[76] Inventors: Otto Huthmann; André Huthmann, both of Sorthum 32, s27632 Midlum, Germany

[21] Appl. No.: 09/250,722
[22] Filed: Feb. 16, 1999

[30] Foreign Application Priority Data

Feb. 17, 1998 [DE] Germany .......................... 198 06 451

[51] Int. Cl.⁷ ...................................................... G05D 7/01
[52] U.S. Cl. ............................................ 137/517; 251/118
[58] Field of Search ............................. 137/517; 251/118

[56] References Cited

U.S. PATENT DOCUMENTS

| | | | |
|---|---|---|---|
| 2,404,924 | 7/1946 | Sacchini | 137/517 |
| 2,845,086 | 7/1958 | Waterman et al. | |
| 2,944,794 | 7/1960 | Myers | 137/517 |
| 3,120,243 | 2/1964 | Allen et al. | |
| 3,379,213 | 4/1968 | Billington | 137/517 |
| 3,469,605 | 9/1969 | Courtot | 137/517 |
| 3,999,570 | 12/1976 | Clements | 137/517 |
| 4,196,753 | 4/1980 | Hammarstedt. | |
| 4,237,922 | 12/1980 | Maier. | |

FOREIGN PATENT DOCUMENTS

| | | |
|---|---|---|
| 0 072 732 | 2/1983 | European Pat. Off. . |
| 2324710 | 12/1974 | Germany . |
| 29 08 881 | 9/1980 | Germany . |
| 0174492A2/A3 | 3/1986 | Germany . |
| 8607316U1 | 8/1987 | Germany . |
| 645 070 | 12/1978 | Switzerland . |

Primary Examiner—Stephen M. Hepperle
Attorney, Agent, or Firm—McGlew & Tuttle, P.C.

[57] ABSTRACT

A flow regulator that always guarantees the same rate of flow independently from the admission pressure is provided. This is achieved by a piston (26), which is mounted movably in the direction of flow and is loaded by an elastic element (29) in the direction opposite the direction of flow, being arranged in a housing (10) of the flow regulator. An annular space around the piston (26) is reduced due to the movement of the piston (26) in the direction of the flow. This flow regulator has a strong throttling action in the case of high admission pressure and a weak throttling action in the case of low admission pressure, so that the rate of flow is always maintained at a constant value.

20 Claims, 2 Drawing Sheets

FLOW REGULATOR

FIELD OF THE INVENTION

The present invention pertains to a flow regulator for regulating the rate of flow of water with a housing that can be screwed into a pipe system or a water fitting.

BACKGROUND OF THE INVENTION

Various embodiments of flow regulators have been used for a long time. The task of the flow regulators is mostly to reduce the rate of flow of water in order to save water and thus ultimately costs as a result. The flow regulators are usually screwed on water taps instead of the usual diffusor or on a shower fitting between the shower fitting and the shower hose. The general design of the flow regulator is always the same. The flow cross section for the water is reduced by a throttle in the flow regulator, so that only a smaller amount of water can flow through. The drawback of the prior-art flow regulators is that the rate of flow also varies as a function of the admission pressure, i.e., the water pressure prevailing in the water pipe. For example, the water pressure in the municipal water system decreases greatly during the morning hours, when the shower is used in many households, so that the rate of flow available is already reduced greatly. This is reduced further by the prior-art flow regulator, so that the rate of flow available is often no longer sufficient for, e.g., taking a shower. At times when little water is consumed, the water pressure in the municipal water system is, in contrast, very high, so that a correspondingly high rate of flow is available. The rate of flow is frequently still so high in this case despite the prior-art flow regulators that it could be further reduced. A compromise must always be made between phases of low pressure and phases of high pressure in the case of the prior-art flow regulators. Therefore, the prior-art devices do not actually deserve the name flow regulator, but they should be more accurately called flow limiters.

SUMMARY AND OBJECTS OF THE INVENTION

Based on this, the basic objective of the present invention is to provide a flow regulator in which a constant rate of flow is always guaranteed regardless of the admission pressure in the water pipe.

This objective is accomplished according to the present invention by a piston arranged in the housing, which is mounted movably in the direction of flow of the water and is loaded by an elastic element against the direction of flow.

According to a first embodiment of the present invention, the volume of a flow equalization chamber decreases as a consequence of the movement of the piston in the direction of flow. As a result, the flow behavior of the water through the flow regulator will change, so that the resistance to flow will change as well. The higher the admission pressure of the water, the smaller will become the volume of the flow equalization chamber and the resistance to flow will consequently increase. The rate of flow is maintained at a constant value as a result regardless of the admission pressure.

According to a second embodiment of the present invention, an annular space around the piston decreases as a consequence of the movement of the piston in the direction of flow. The annular space around the piston forms a throttling flow for the water. Depending on the admission pressure, the piston is pressed against the elastic element in the direction of flow of the water. The higher the admission pressure, the smaller will become the free cross section of the annular space. The throttling action of the flow regulator according to the present invention thus increases as a function of the admission pressure. The rate of flow is maintained as a result at a constant value regardless of the admission pressure.

The above-described two embodiments may be designed such that the rate of flow is maintained at a constant value by each of the two measures per se. However, according to a specific design embodiment, both measures are used together, coordinated with one another such that the rate of flow is maintained at a constant value regardless of the admission pressure.

According to a design embodiment of the present invention, the piston cooperates with a seat, wherein the piston and/or the seat are truncated cone-shaped in their areas in which they cooperate with one another. The piston and/or the seat preferably taper in the direction of flow.

According to a variant of the present invention, the piston has a truncated cone-shaped intake cone. The resistance to flow of the piston for the water can be varied by varying the cone angle of this intake cone. The desired rate of flow, which the flow regulator shall guarantee regardless of the admission pressure, can thus be set. This is done empirically. If the amount of water shall be further reduced at a given cone angle for the intake cone and the resistance to flow shall thus be increased, this can be varied by milling grooves in the circumferential direction of the intake cone.

Additional features of the present invention are related to the design embodiment of the flow regulator.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
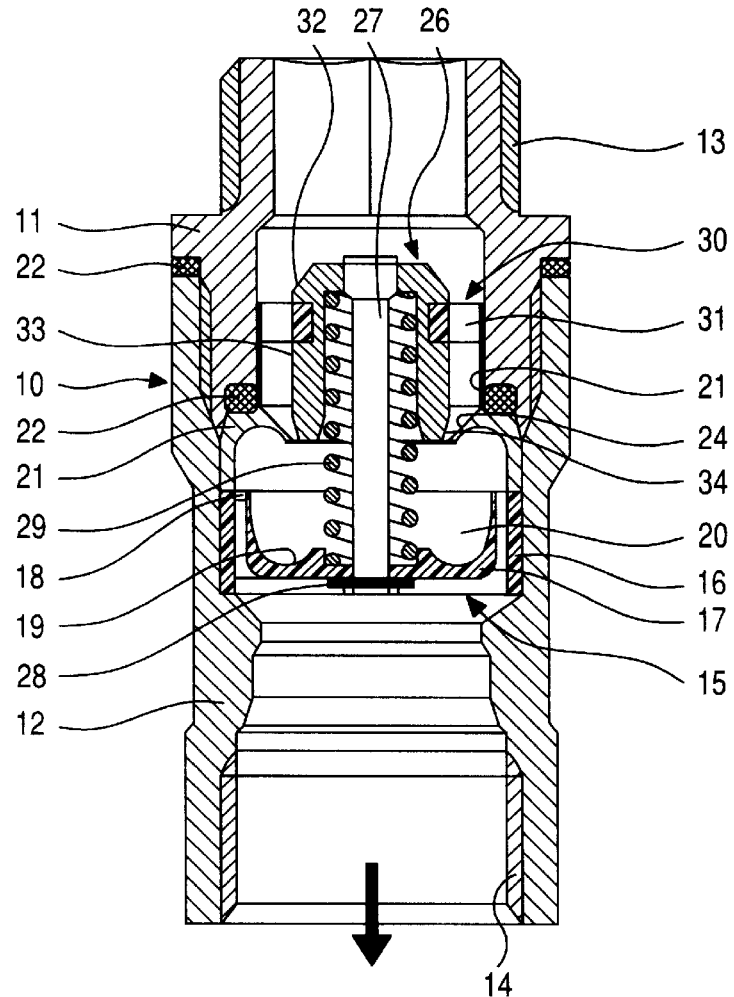
FIG. 1 is a cross sectional view of a flow regulator with the features of the present invention for installation in a water pipe system, e.g., between a fitting and a shower hose.
Figure 2:
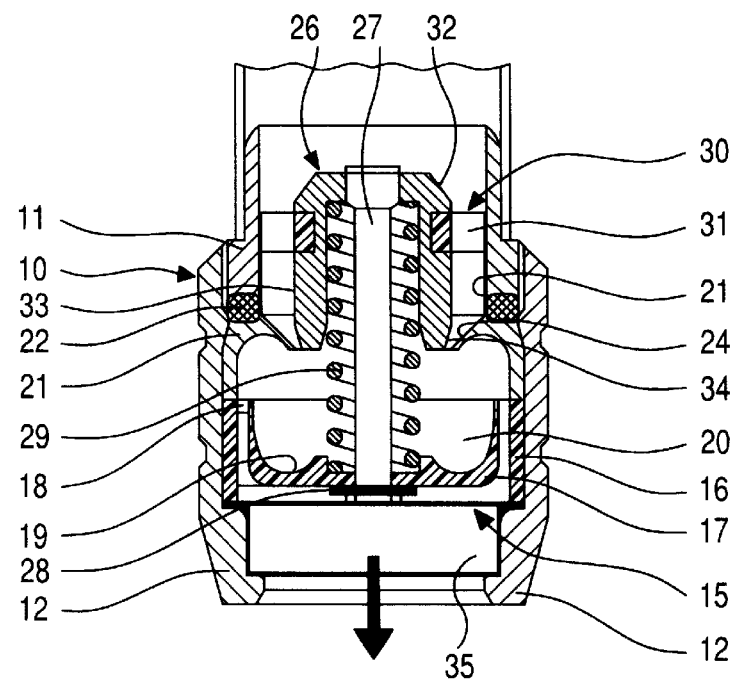
FIG. 2 is a cross sectional view of a flow regulator with the features of the present invention for screwing into a water tap.
Figure 3:
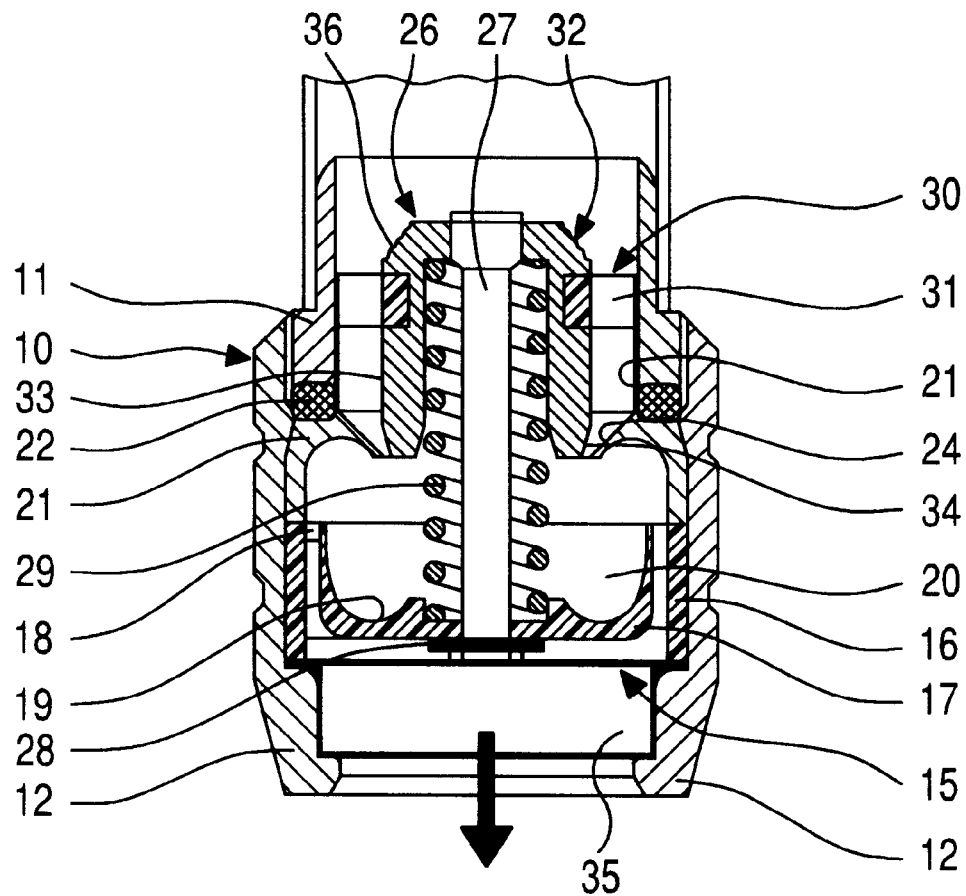
FIG. 3 is a cross-sectional view showing a further embodiment according to the invention.

FIGS. 1 and 2 show flow regulators which have the same design concerning their mode of operation. They differ essentially only by the place of use. The flow regulator according to FIG. 1 may be screwed into a water pipe system, e.g., between a shower fitting and a shower hose. The flow regulator according to FIG. 2 is intended for being screwed into a water tap.

The flow regulator according to FIG. 1 has a housing 10, which is formed by an upper housing part 11 and a lower housing part 12. The upper and lower housing parts 11 and 12 are screwed one into the other, as can be recognized from FIG. 1. The upper housing part 11 has an additional thread 13 at its upper end. The lower housing part 12 correspondingly has a corresponding thread 14. The thread 13 is a exterior thread of a male element in this case, while the thread 14 is a interior thread of a female element. The housing 10 can thus be screwed into a water pipe system, e.g., between a shower fitting and a shower hose. Depending on the place of use, the thread 13 may also be a interior thread of a female element and the thread 14 may be a exterior thread of a male element. It is important that the upper housing part 11 be arranged upstream when viewed in the direction of flow. The threads 13 and 14 are always of the type of thread typical of water pipes and fittings.

An insert 15 is arranged in the lower housing part 12. This comprises, made in one piece with it, an outer ring 16 and a bottom piece 17, which is arranged in it and is connected to the ring 16 via webs 18. The water can flow through openings between the ring 16 and the bottom piece 17.

The bottom piece 17 itself has a circular recess 19 on its side facing the flow. This recess 19 forms a flow equalization chamber 20 in the bottom piece 17.

Yet another seat 21 is arranged in the lower housing part 12 above the insert 15. Together with the insert 15, this seat 21 is tensioned by screwing the upper housing part 11 into the lower housing part 12. A seal 22 ensures a sealing closure between the upper housing part 11 and the seat 21. Another seal 23 is arranged between the upper and lower housing parts.

The seat 21 has a truncated cone-shaped seat surface 24 tapering in the direction of flow. A projection 25 of the seat 21 is led upward into the area of the upper housing part 11.

A piston 26 is mounted movably up and down, i.e., in the direction of flow, within the housing 10. The piston 26 is fixed on a shaft 27 for this purpose. The piston 26 is fixed to the shaft 27 by a manner of riveted connection, by the piston 26 being attached to the shaft 27 and the shaft 27 being upset at the top end. The piston 26 is thus fixed on the shaft 27 in a non-positive manner. The shaft 27 is led through the hole in the insert 15, namely, in its bottom piece 17 and is secured by a locking ring 28 under the bottom piece 17. Pretensioning is brought about by an elastic element, namely, a coil spring 29, in the upward direction, i.e., against the direction of flow of the water. The piston 26 is guided in the housing 10, specifically at the projection 25 of the seat 21, by a guide ring 30. The guide ring 30 is seated in an annular groove on the piston 26 and is guided at the projection 25 by webs pointing in the outwardly direction in a star-shaped pattern, there being four such webs in this case.

The piston 26 itself has an intake cone 32 expanding in the direction of flow, a cylindrical area 33 arranged under the intake cone 32 and, under the cylindrical area 33, a truncated cone-shaped piston area 34 tapering in the direction of flow. The intake cone may have grooves 36 extending in a circumferential direction.

The flow regulator according to FIG. 2 has the same general design as the flow regulator according to FIG. 1. Identical parts are therefore designated by the same reference numbers. Reference is also made to the description for FIG. 1. However, since the flow regulator according to FIG. 2 is intended for being screwed into a water tap instead of an otherwise usual diffusor, its lower housing part 12 does not have threads. Rather, a screen insert 35, which is used, like the otherwise usual diffusors, to enrich the water with oxygen, is inserted into the lower housing part 35.

The mode of operation of the flow regulators according to FIGS. 1 and 2 is as follows:

As a consequence of the pressure of the water flowing in, which is determined by the admission pressure in the water system, the piston 26 is pressed downward against the force of the coil spring 29. If the water pressure is very low, the piston almost remains in its upper resting position. If, however, the water pressure is very high, the piston 26 is pressed far down. As a result, an annular space between the piston 26 and the seat 21 or, more precisely, the seat surface 24, becomes smaller. At the same time, the available volume of the flow equalization chamber 20 is reduced. The throttling action of the flow regulator increases due to these measures as a consequence of the changed flow conditions. A lower admission pressure thus brings about a strong throttling action of the flow regulator. As a result, the rate of flow of the water is always maintained at a constant value independently from the admission pressure.

To set the desired rate of flow, which is independent from the admission pressure, e.g., 3 L per minute, the intake resistance for the water flow is set at the intake cone 32. This is done by empirically selecting the cone angle for the intake cone 32. In addition or as an alternative, grooves extending in the circumferential direction, by which the intake resistance for the water flow is also changed, may be arranged on the intake cone.

The rate of flow is also affected by the pretension and the stiffness of the coil spring 29 as well as the maximum stroke of the piston 26, which also determines the maximum allowable pressure fluctuations within the water pipe for the satisfactory use of the flow regulator. The stroke of the piston 26 thus affects the rate of flow, because the size of the flow equalization chamber 20 also decreases with decreasing stroke. As a result, the flow-off behavior of the water at the piston 26 and thus the pressure gradient over the piston 26 will change as well. All influential variables must ultimately be carefully coordinated with one another for the desired, admission pressure-independent amount of water. This is done empirically.

All parts of the flow regulator are manufactured from plastics or metal alloys which are harmless in terms of food chemistry. Specifically, all parts through which water flows, such as the guide ring 30, the insert 15 and the screen 35, are made of plastic. The other parts are made of Ametal. Lime deposits on components of the flow regulator are reliably avoided as a result. In addition, Ametal has the advantage that flushing out of zinc is not to be feared, unlike in the case of other copper alloys.

Furthermore, due to the guide ring 30 and the insert 15 being made of plastic, friction of metal on metal during the operation of the flow regulator is avoided. There is always only friction of plastic parts with metal parts. Noise generation during the operation is avoided as a result.

While specific embodiments of the invention have been shown and described in detail to illustrate the application of the principles of the invention, it will be understood that the invention may be embodied otherwise without departing from such principles.

APPENDIX

List of Reference Numbers

10 Housing
11 Housing part
12 Housing part
13 Thread
14 Thread
15 Insert
16 Ring
17 Bottom piece
18 Web
19 Recess 20 Flow equalization chamber
21 Seat
22 Seal
23 Seal
24 Seat surface
25 Projection
26 Piston
27 Shaft
28 Locking ring
29 Coil spring
30 Guide ring
31 Web
32 Intake cone
33 Cylindrical area
34 Piston area
35 Screen

What is claimed is:

1. A flow regulator for regulating the rate of flow of water, the flow regulator comprising:
   a housing that can be screwed into a pipe system or a water fitting;
   a piston mounted in said housing movably in the direction of flow of the water, said piston and housing cooperating to form a throttle that provides at least a minimum opening for flow, said opening being varied in size depending upon the position of said piston;
   an elastic element loading said piston against the direction of flow, said elastic element being arranged in said housing; and
   a flow equalization chamber defined in said housing downstream of said piston, said flow equalization chamber being formed in a recess of a bottom piece downstream of said piston, wherein said piston has an intake cone of a truncated cone-shaped design.

2. The flow regulator in accordance with claim 1, wherein said flow equalization chamber causes the flow to become turbulent and a volume of said flow equalization chamber is reduced as a consequence of movement of said piston in the direction of flow.

3. The flow regulator in accordance with claim 1, wherein an annular space around the said piston is reduced as a consequence of the movement of the said piston in the direction of flow.

4. The flow regulator in accordance with claim 2, wherein an annular space around the said piston is reduced as a consequence of the movement of the said piston in the direction of flow.

5. The flow regulator in accordance with claim 1, further comprising a seat surface provided in said housing, said piston having a lower piston area cooperating with said seat surface, wherein said lower piston area and/or said seat surface have a truncated cone-shape.

6. The flow regulator in accordance with claim 5, wherein said lower piston area and/or said seat surface taper in the direction of flow.

7. The flow regulator in accordance with claim 5, wherein said lower piston area and said seat surface have different cone angles.

8. The flow regulator in accordance with claim 2, further comprising a seat surface provided in said housing, said piston having a lower piston area cooperating with said seat surface, wherein said lower piston area and/or said seat surface have a truncated cone-shape.

9. The flow regulator in accordance with claim 1, wherein said intake cone has grooves extending in the circumferential direction.

10. The flow regulator in accordance with claim 1, wherein said piston is guided in the housing by a guide ring made of plastic.

11. The flow regulator in accordance with claim 1, wherein said elastic element is a coil spring.

12. A flow regulator for regulating the rate of flow of water, the flow regulator comprising:
    a housing that can be screwed into a pipe system or a water fitting;
    a piston mounted in said housing movably in the direction of flow of the water, said piston and housing cooperating to form a throttle that provides at least a minimum opening for flow, said opening being varied in size depending upon the position of said piston;
    an elastic element loading said piston against the direction of flow, said elastic element being arranged in said housing;
    said piston is guided in the housing by a guiding ring and a bottom piece also supporting said elastic element, both the guiding ring and the bottom piece being of plastic to define a plastic guiding ring piston interface and a plastic bottom piece elastic element interface whereby noise is reduced by avoiding frictional contact of metal on metal during movement of said piston.

13. The flow regulator in accordance with claim 12, further comprising:
    a flow equalization chamber defined in said housing downstream of said piston, said flow equalization chamber being formed in a recess of said bottom piece downstream of said piston, wherein a volume of said flow equalization chamber is reduced as a consequence of movement of said piston in the direction of flow and an annular space around said piston is reduced as a consequence of the movement of the said piston in the direction of flow.

14. The flow regulator in accordance with claim 12, further comprising a seat surface provided in said housing, said piston having a lower piston area cooperating with said seat surface, wherein said lower piston area and/or said seat surface have a truncated cone-shape.

15. The flow regulator in accordance with claim 14, wherein said lower piston area and said seat surface have different cone angles.

16. The flow regulator in accordance with claim 12, wherein said piston has an intake cone of a truncated cone-shaped design.

17. The flow regulator in accordance with claim 16, wherein said intake cone has grooves extending in the circumferential direction.

18. A flow regulator for regulating the rate of flow of water, the flow regulator comprising:
    a housing that can be screwed into a pipe system or a water fitting;
    a piston mounted in said housing movably in the direction of flow of the water;
    a seat surface provided in said housing, said piston having a piston area cooperating with said seat surface to form a flow throttle, wherein said lower piston area and/or said seat surface have a truncated cone-shape to define a varying fluid throughput annular opening, movement of said piston changing said annular opening from a maximum throughput opening for a maximum fluid flow to a minimum throughput opening for a minimum fluid flow, said minimum fluid flow being a non zero positive value,
    a bottom piece defining a flow equalization chamber in said housing directly downstream of said seat, said flow equalization chamber causing the flow to become turbulent, a volume of said flow equalization chamber being reduced as a consequence of movement of said piston in the direction of flow;

an elastic element loading said piston against the direction of flow, said elastic element being arranged in said housing; and a guiding ring guiding said piston in said housing, said guiding ring and said bottom piece supporting said elastic element.

19. The flow regulator in accordance with claim 18, wherein both said guiding ring and said bottom piece are plastic.

20. The flow regulator in accordance with claim 18, wherein said piston has an intake side with a truncated cone-shape with grooves extending in the circumferential direction.

* * * * *